(12) United States Patent
Rocher et al.

(10) Patent No.: US 11,410,544 B2
(45) Date of Patent: Aug. 9, 2022

(54) SENSOR HAVING DUPLICATE DETECTION LINES

(71) Applicants: Continental Automotive France, Toulouse (FR); Continental Automotive GmbH, Hannover (DE)

(72) Inventors: Jacques Rocher, Saint Orens de Gameville (FR); Leroy Yannick, Toulouse (FR)

(73) Assignees: Continental Automotive France; Continental Automotive GmbH

(*) Notice: Subject to any disclaimer, the term of this patent is extended or adjusted under 35 U.S.C. 154(b) by 200 days.

(21) Appl. No.: 16/609,349

(22) PCT Filed: Jun. 29, 2018

(86) PCT No.: PCT/FR2018/051609
§ 371 (c)(1),
(2) Date: Oct. 29, 2019

(87) PCT Pub. No.: WO2019/002791
PCT Pub. Date: Jan. 3, 2019

(65) Prior Publication Data
US 2020/0058216 A1 Feb. 20, 2020

(30) Foreign Application Priority Data
Jun. 30, 2017 (FR) .................................... 1756119

(51) Int. Cl.
*G08C 19/02* (2006.01)
*F16C 3/06* (2006.01)
*G01D 21/02* (2006.01)
(52) U.S. Cl.
CPC ............... *G08C 19/02* (2013.01); *F16C 3/06* (2013.01); *G01D 21/02* (2013.01)

(58) Field of Classification Search
CPC ........... G08C 19/02; F16C 3/06; G01D 21/02; G01D 21/00
See application file for complete search history.

(56) References Cited

U.S. PATENT DOCUMENTS 4,160,937 A    7/1979  Fiorini
5,196,826 A *  3/1993  Whiting .................. G01S 13/04
                                                340/521
(Continued)

FOREIGN PATENT DOCUMENTS

CN    101339073 A    1/2009
CN    201397528 Y    2/2010
(Continued)

OTHER PUBLICATIONS

International Search Report and Written Opinion for International Application No. PCT/FR2018/051609, dated Oct. 9, 2018—9 pages.

(Continued)

*Primary Examiner* — Natalie Huls
*Assistant Examiner* — Michael J Singletary
(74) *Attorney, Agent, or Firm* — RatnerPrestia

(57) ABSTRACT

A current sensor including a sensitive portion with a first detection line and a second detection line; the sensitive portion is suitable for detecting the passage of a moving target, a connection device suitable for delivering a detection signal arising from the sensitive portion. The current sensor further includes a duplication device suitable for duplicating the first detection line to make a duplicate first detection line and for duplicating the second detection line to make a duplicate second detection line.

8 Claims, 3 Drawing Sheets

(56) References Cited

U.S. PATENT DOCUMENTS

| | | | |
|---|---|---|---|
| 7,700,919 B2 | 4/2010 | Dupont et al. | |
| 8,482,353 B2 | 7/2013 | Blednov | |
| 8,660,156 B2 | 2/2014 | Telford et al. | |
| 9,261,545 B2 | 2/2016 | Iwamoto et al. | |
| 10,007,749 B2 | 6/2018 | Cheng et al. | |
| 2012/0052972 A1 | 3/2012 | Bentley | |
| 2013/0113554 A1* | 5/2013 | Bai | H03F 3/20 330/124 R |
| 2014/0088789 A1 | 3/2014 | Chen | |
| 2015/0022198 A1* | 1/2015 | David | G01R 33/093 324/251 |
| 2018/0120110 A1 | 5/2018 | Song et al. | |
| 2020/0003899 A1* | 1/2020 | Lungenschmied | H01L 31/03762 |

FOREIGN PATENT DOCUMENTS

| | | |
|---|---|---|
| CN | 102098006 A | 6/2011 |
| CN | 202253966 U | 5/2012 |
| CN | 102640368 A | 8/2012 |
| CN | 102654812 A | 9/2012 |
| CN | 203658594 U | 6/2014 |
| CN | 104885025 A | 9/2015 |
| CN | 105320024 A | 2/2016 |
| CN | 105867238 A | 8/2016 |
| CN | 106455245 A | 2/2017 |
| CN | 106663135 A | 6/2017 |
| EP | 0028471 A1 | 5/1981 |
| EP | 0310279 A2 | 4/1989 |
| FR | 2362708 A1 | 3/1978 |
| JP | 2016170099 A | 9/2016 |
| JP | 2016201308 A | 12/2016 |
| KR | 20160140038 A | 12/2016 |
| WO | 2017003148 A1 | 1/2017 |
| WO | 2017025026 A1 | 2/2017 |
| WO | WO-2018180557 A1 * | 10/2018 ............ G01M 15/06 |

OTHER PUBLICATIONS

Chinese Office Action with Search Report for Chinese Application No. 201880043506.7, dated Mar. 12, 2021, 11 pages.

Li, Y. et al., "The Lagrangian Relaxation based Resources Allocation Methods for Air-to-Ground Operations under Uncertainty Circumstances," 2009 Chinese Control and Decision Conference (CCDC 2009), IEEE Xplore, pp. 5609-5614.

* cited by examiner

SENSOR HAVING DUPLICATE DETECTION LINES

CROSS REFERENCE TO RELATED APPLICATIONS

This application is the U.S. National Phase Application of PCT International Application No. PCT/FR2018/051609, filed Jun. 29, 2018, which claims priority to French Patent Application No. 1756119, filed Jun. 30, 2017, the contents of such applications being incorporated by reference herein.

FIELD OF THE INVENTION

The present invention pertains in a general manner to the connector technology for an electronic device, such as, for example, a sensor.

The invention is applicable in particular in the automotive field. It may be implemented, for example, in a camshaft sensor or in a crankshaft sensor delivering information in the form of a variation in current.

BACKGROUND OF THE INVENTION

A motor vehicle nowadays includes an increasing amount of onboard electronics, requiring connections of varying complexity. Thus, in a motor vehicle, several sensors are used and coupled to electronic computers, for example, to ensure driver safety, air ventilation in the passenger compartment, as well as for the operation of the internal combustion engine.

To ensure that the internal combustion engine is operating correctly, several sensors are used and are coupled, for example, to at least one electronic computer, which is also referred to as the "engine control computer".

Thus, for example, at least one crankshaft sensor and one camshaft sensor are used and make it possible to determine, with relatively high accuracy, the position of the pistons in an engine cycle using dedicated computer programs run by the engine control computer.

A crankshaft sensor includes, inter alia, a sensitive portion suitable for detecting the passage of teeth of a crankshaft gear and a processing device suitable for shaping a detection signal arising from the sensitive portion of the crankshaft sensor. Depending on the detection principle of the sensitive portion, such as, for example, Hall effect, three wires are used at the output of the crankshaft sensor to transmit the detection signal to the engine control computer. This type of crankshaft sensor is often referred to by those skilled in the art as a voltage sensor, i.e. the information that it generates is in the form of a variation in voltage. However, with the growing number of sensors, there is an increasing need for connection pins to the engine control computer.

Over the past few years, current sensors have been developed in order to decrease the number of connections to the electronic computer. These sensors therefore deliver information in the form of a variation in current. Thus, with this new technology, a crankshaft sensor now includes, for example, only two connection wires. Of course, the sensitive portion remains identical to the voltage sensor.

By virtue of this new technology, it is now possible to couple current sensors in parallel in one and the same wiring harness.

To connect the sensors to the engine control computer, it is necessary to link them at the level of the wiring harness by performing at least one splice per sensor. Thus, by virtue of the use of these current centres, the total number of pins used for the engine control computer is substantially constant. The presence of splices in the wiring harness substantially increases the manufacturing cost of the motor vehicle and above all increases the risk of electrical failures.

SUMMARY OF THE INVENTION

An aspect of the invention proposes a duplication device that provides a partial or full solution to the technical shortcomings of the cited prior art.

To this end, a first aspect of the invention proposes a sensor delivering detection information in the form of a variation in current comprising a sensitive portion with a first detection line and a second detection line; the sensitive portion is suitable for detecting the passage of a moving target, a connection device suitable for delivering a detection signal arising from the sensitive portion, a duplication device suitable for duplicating the first detection line to make a duplicate first detection line and for duplicating the second detection line to make a duplicate second detection line.

For example, to facilitate incorporation within a current sensor, it is proposed that a connection device be coupled to the duplication device.

To optimize the connection between at least two current sensors, it is proposed, in one exemplary embodiment of the invention, that the connection device include a first terminal coupled to the first detection line, a second terminal coupled to the duplicate first detection line; a third terminal coupled to the second detection line and a fourth terminal coupled to the duplicate second detection line.

To decrease the manufacturing cost, it is proposed, for example, that the duplication device be incorporated within the current sensor.

As a variant, it is proposed that the duplication device be incorporated within the connection device.

In a second aspect of the invention, what is proposed is an assembly of at least two sensors with a current sensor and a second current sensor, the two current sensors being electrically coupled in parallel using the connection devices.

In one exemplary embodiment, a first terminal and a second terminal of the connection device are coupled to a first terminal and a second terminal of another connection device, and a third terminal and a fourth terminal of the connection device are coupled to a third terminal and a fourth terminal of the other connection device.

To control the two current sensors, it is proposed, for example, that the two current sensors be coupled to an electronic computer.

BRIEF DESCRIPTION OF THE DRAWINGS

Other features and advantages of aspects of the invention will become more apparent upon reading the description that will follow. This description is purely illustrative and should be read with reference to the appended drawings, in which.

DETAILED DESCRIPTION OF THE PREFERRED EMBODIMENTS

Figure 1:
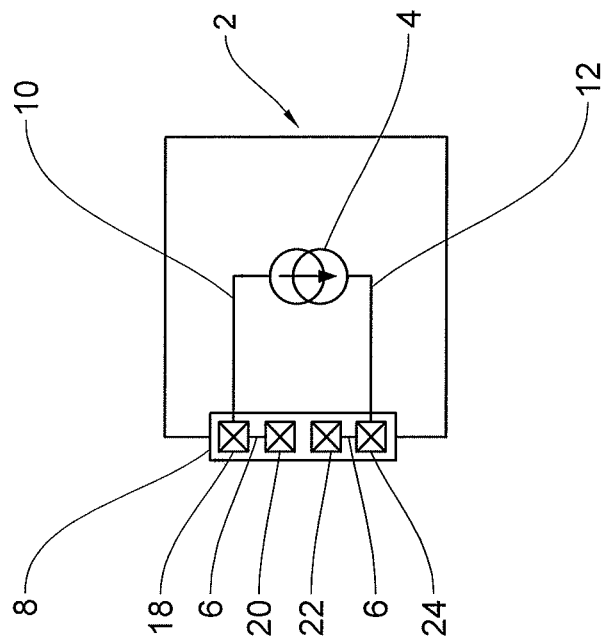
FIG. 1 is a schematic diagram of a current sensor according to an aspect of the present invention.

FIG. 1 shows a schematic view of a current sensor 2 according to an aspect of the present invention. The current sensor 2 includes a sensitive portion 4, a duplication device 6 and a connection device 8. Preferably, the current sensor 2 delivers a detection signal in the form of a variation in current. The current sensor 2 may be, for example, a camshaft position sensor or a crankshaft position sensor. This is given purely by way of illustration and is in no way limiting with regard to the scope of an aspect of the invention.

The sensitive portion 4 is suitable for both detecting the passage of teeth of a target, for example a crankshaft target (not visible in the drawings) and generating, through a first detection line 10 and a second detection line 12, a detection signal that is representative of the passage of the teeth. For example, the sensitive portion 4 is based on a Hall-effect detection principle. The internal structure of the sensitive portion 4 will not be described in detail in the text of the description since it is well known to those skilled in the art.

Ingeniously, the duplication device 6 is suitable for duplicating the first detection line 10 and the second detection line 12. In one exemplary embodiment, such as illustrated in FIG. 1, the duplication device 6 duplicates the first detection line 10 to make a duplicate first detection line 14. Furthermore, the duplication device 6 is also suitable for duplicating the second detection line 12 to make a duplicate second detection line 16. The duplication device 6 is, for example, produced on a silicon chip, which may be that of the current sensor 2.

The connection device 8 is for example an electrical connector having a first terminal 18, a second terminal 20, a third terminal 22 and a fourth terminal 24. The connection device 8 may be a market-standard four-pin connector or a connector produced according to the desired application. The connection device 8 may also comply with permeability and electromagnetic-compatibility standards known to those skilled in the art and required for use in the automotive environment.

In one embodiment, the first terminal 18 is coupled to the first detection line 10, the second terminal 20 is coupled to the duplicate first detection line 14, the third terminal 22 is coupled to the second detection line 12, and lastly the fourth detection line 24 is coupled to the duplicate second detection line 16. Advantageously, the duplication device 6 is compatible with a socket of the connection device 8.

Figure 2:
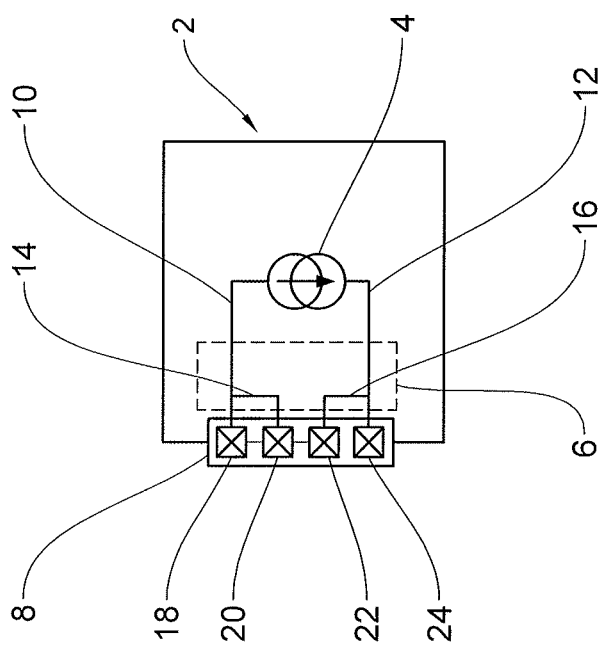
FIG. 2 is a schematic diagram of another embodiment of an aspect of the invention.

In another exemplary embodiment, the duplication device 6 is positioned and forms part of the connection device 8 as illustrated in FIG. 2. Thus, ingeniously, the first terminal 18 is coupled to the second terminal 20, making a duplicate of the first detection line 10, and the third terminal 22 is coupled to the fourth terminal 24, making a duplicate of the second detection line 12. In one exemplary embodiment, the duplication device 6 may be a metal track inside the connection device 8.

Figure 3:
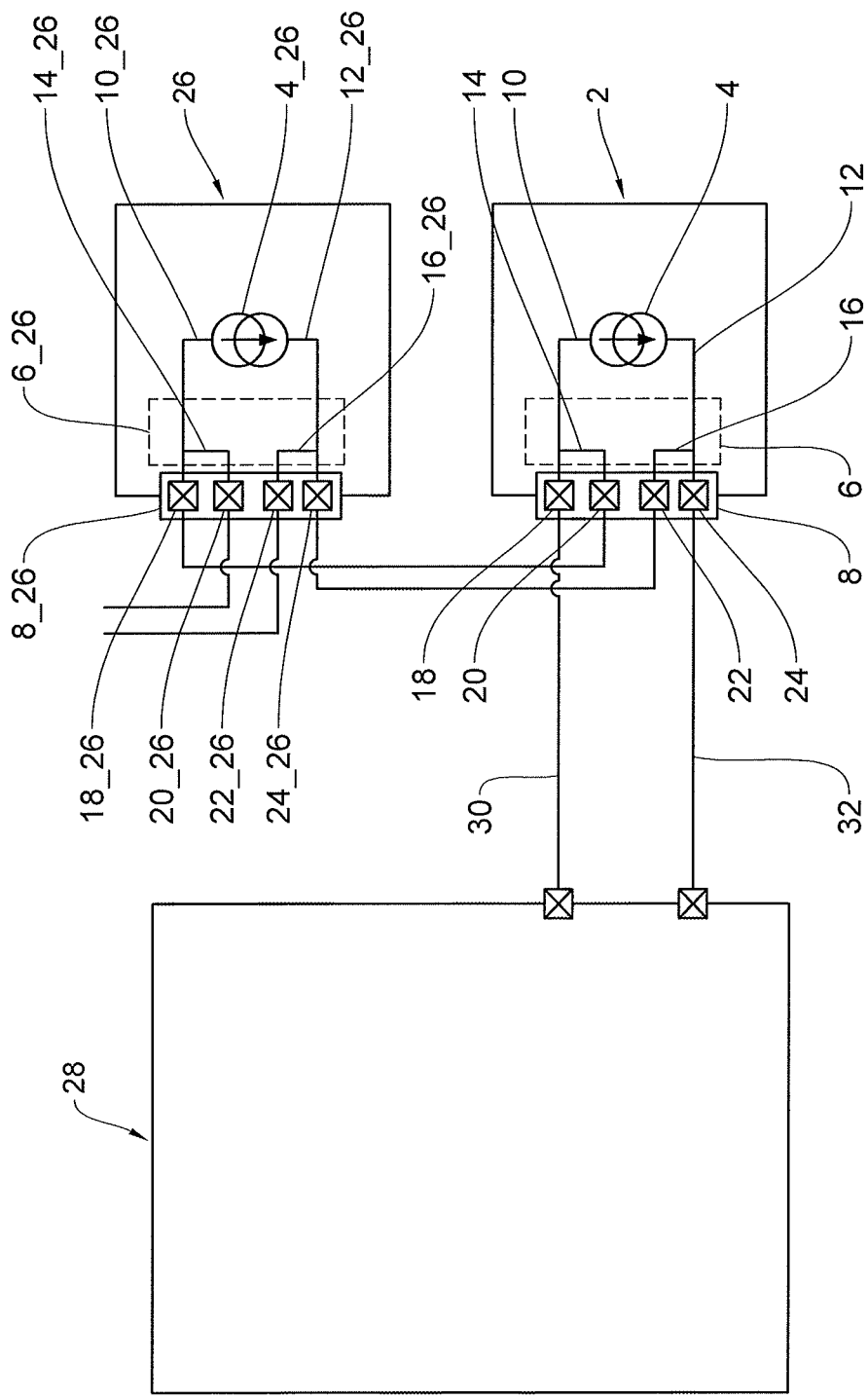
FIG. 3 is a schematic diagram of the parallel electrical connection of two current sensors from FIG. 1.

FIG. 3 shows the current sensor 2 and a second current sensor 26 that are coupled to an electronic computer 28. In one preferred embodiment, the second current sensor 26 has the same technical features as the current sensor 2 presented above.

Thus, the second current sensor 26 includes a sensitive portion 4_26, a duplication device 6_26 and a connection device 8_26. The sensitive portion 4_26 generates a detection signal through a first detection line 10_26 and a second detection line 12_26.

The duplication device 6_26 duplicates the first detection line 10_26 to make a duplicate first detection line 14_26 and duplicates the second detection line 12_26 to make a duplicate second detection line 16_26.

The connection device 8_26 includes a first terminal 18_26, a second terminal 20_26, a third terminal 22_26 and a fourth terminal 24_26.

Advantageously, by virtue of the device of an aspect of the invention, it is possible to couple the current sensor 2 in parallel with the second current sensor 26 without performing a splice in the wiring harness of the motor vehicle. Thus, as illustrated in the example of FIG. 3, the first terminal 18 of the sensor 2 is coupled to the electronic computer 28 via a first electrical transmission line 30, the second terminal 20 is coupled to the first terminal 18_26 of the second current sensor 26, the third terminal 20 of the current sensor 2 is coupled to the electronic computer 28 via a transmission line 32, and lastly the fourth terminal 24 is coupled to the third terminal 22_26 of the second current sensor 26.

Of course, the connection device 8 may also take a different shape from that shown in FIG. 3.

For the purpose of simplifying the connections for the current sensors 2, 26, it is ingeniously proposed, as a variant embodiment, that an electrical polarizer 34 be incorporated for optimizing the assembly time of the current sensors 2, 26. Specifically, as known to those skilled in the art, the current flowing through the current sensors 2, 26 is polarized, i.e. it flows in a determined direction, and it is therefore necessary to observe this polarity for the current sensors 2, 26 to operate correctly. The electrical polarizer 34 will be presented for the case of the current sensor 2.

The electrical polarizer 34 includes a diode bridge with a first diode D1, a second diode D2, a third diode D3 and a fourth diode D4, the four diodes being coupled in series with one another. For example, a cathode D1_K1 of the first diode D1 is coupled to an anode D2_A2 of the second diode D2, a cathode D2_K2 of the second diode D2 is coupled to a cathode D3_K3 of the third diode D3, an anode D3_A3 of the third diode D3 is coupled to a cathode D4_K4 of the fourth diode D4, and lastly an anode D4_A4 of the fourth diode D4 is coupled to the anode D1_A1 of the first diode D1.

In one exemplary embodiment, the first detection line 10 is coupled to the cathode D2_K2 and to the cathode D3_K3; and the second detection line 12 is coupled to the anode D1_A1 and to the anode D4_A4.

Furthermore, it is proposed that the first terminal 18 be coupled to the cathode D1_K1 and to the anode D2_A2, and that the third terminal 22 be coupled to the anode D3_A3 and to the cathode K4_D4. Thus, as known to those skilled in the art, depending on the polarity of the current, at least two of the four diodes of the electrical polarizer 34 will be activated, allowing the current to flow optimally without risking the destruction of the sensors 2, 26 and/or of the electronic computer 28.

Figure 4:
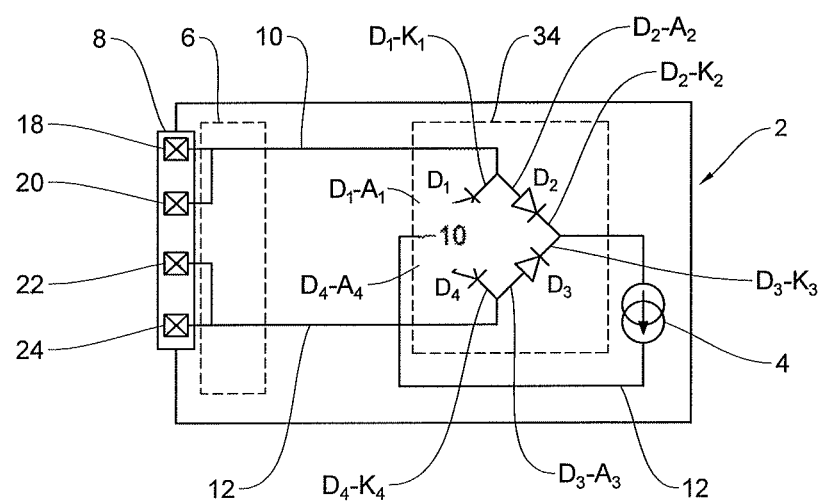
FIG. 4 is a schematic diagram of the parallel electrical connection of two current sensors from FIG. 2 in an additional embodiment.

To simplify the connections between the current sensors 2, 26, the duplication device 6 is also used. This device is therefore, in the case of FIG. 4, suitable for duplicating the first terminal 18 and the third terminal 22. In the example of FIG. 4, the duplication device 6 is incorporated within the connection device 8, but it may also be incorporated within the chip of the current sensor 2.

An aspect of the present invention thus allows the parallel collection of at least two current sensors without a need for splicing in the wiring harness of the motor vehicle. Furthermore, by virtue of an aspect of the invention and the presence of the electrical polarizer, it is no longer necessary to observe the polarity of the current sensors, thus optimizing the fitting time of said current sensors.

Of course, aspects of the present invention are not limited to the preferred embodiment described above and illustrated in the drawing and to the variant embodiments mentioned, but extends to all variants within the competence of those skilled in the art.

The invention claimed is:

1. A sensor delivering detection information in the form of a variation in current comprising:
    a sensitive portion with a first detection line and a second detection line; the sensitive portion is suitable for detecting the passage of a moving target,
    a connection device suitable for delivering a detection signal arising from the sensitive portion, and
    a duplicate first detection line and a duplicate second detection line,
    wherein the connection device includes a first terminal coupled to the first detection line, a second terminal coupled to the duplicate first detection line; a third terminal coupled to the second detection line and a fourth terminal coupled to the duplicate second detection line.

2. The sensor as claimed in claim 1, wherein the connection device is coupled to the duplicate first detection line and the duplicate second detection line.

3. The sensor as claimed in claim 1, wherein the duplicate first detection line and the duplicate second detection line are incorporated within the current sensor.

4. The sensor as claimed in claim 1, wherein the duplicate first detection line and the duplicate second detection line are incorporated within the connection device.

5. An assembly of at least two sensors with a sensor and a second sensor as claimed in claim 1, wherein the two current sensors are electrically coupled in parallel using the connection devices.

6. The assembly of at least two sensors as claimed in claim 5, wherein the first terminal and the second terminal of the connection device are coupled to a first terminal and a second terminal of another connection device, and the third terminal and the fourth terminal of the connection device are coupled to a third terminal and a fourth terminal of the other connection device.

7. The assembly of at least two sensors as claimed in claim 5, wherein the two sensors are coupled to an electronic computer.

8. The assembly of at least two sensors as claimed in claim 6, wherein the two sensors are coupled to an electronic computer.

* * * * *